(12) United States Patent
Liang et al.

(10) Patent No.: US 10,483,758 B2
(45) Date of Patent: Nov. 19, 2019

(54) METHOD AND APPARATUS FOR CONTROLLING A HYBRID ENERGY STORAGE SYSTEM

(71) Applicant: ABB Technology AG, Zurich (CH)

(72) Inventors: Jiaqi Liang, Cary, NC (US); Li Qi, Cary, NC (US)

(73) Assignee: ABB Research Ltd., Zurich (CH)

( * ) Notice: Subject to any disclaimer, the term of this patent is extended or adjusted under 35 U.S.C. 154(b) by 569 days.

(21) Appl. No.: 14/150,414

(22) Filed: Jan. 8, 2014

(65) Prior Publication Data

US 2015/0194820 A1    Jul. 9, 2015

(51) Int. Cl.
*H02J 1/10* (2006.01)
*H02J 1/14* (2006.01)
*H02J 7/34* (2006.01)

(52) U.S. Cl.
CPC .............. *H02J 1/102* (2013.01); *H02J 1/10* (2013.01); *H02J 1/14* (2013.01); *H02J 7/345* (2013.01)

(58) Field of Classification Search
CPC ....................................................... H02J 7/007
USPC ......................................................... 320/134
See application file for complete search history.

(56) References Cited

U.S. PATENT DOCUMENTS

| 7,939,969 B2 | 5/2011 | Ichikawa |
| 7,980,905 B2 | 7/2011 | Rembach et al. |
| 8,138,720 B2 | 3/2012 | Snyder et al. |

(Continued)

FOREIGN PATENT DOCUMENTS

| CN | 102377192 | 3/2012 |
| CN | 102377192 A | 3/2012 |

(Continued)

OTHER PUBLICATIONS

Chen, W., et al., "Super-Capictors Based Hybrid Converter in Marine Electric Propulsion System," 2010 XIX International Conference on Electrical Machines (ICEM). Sep. 6-8, 2010. pp. 1-6. Rome, Italy.

(Continued)

*Primary Examiner* — Drew A Dunn
*Assistant Examiner* — Harry O'Neill-Becerril
(74) *Attorney, Agent, or Firm* — Taft Stettinius & Hollister LLP; J. Bruce Schelkopf

(57) ABSTRACT

A control apparatus and corresponding control method use per-unit filtering in a plurality of power-sharing controllers, to obtain a power-sharing command signal for respective ones among a plurality of different energy storage units in a hybrid energy storage system. The hybrid energy storage system includes two or more types of energy storage units and the power-sharing command signal for each energy storage unit is obtained by filtering an input signal using a filter having a filter response that is tailored to the energy storage characteristics of the energy storage unit. The input signal reflects load variations on the electrical grid and may be locally generated or provided by a remote node. While the power-sharing control loops used for each energy storage unit advantageously may be the same in terms of architecture and implementation, each loop uses tailored, dedicated filtering and, possibly, individualized values of one or more other control parameters.

16 Claims, 10 Drawing Sheets

(56) References Cited

U.S. PATENT DOCUMENTS

| | | | |
|---|---|---|---|
| 2003/0007369 A1* | 1/2003 | Gilbreth | H02J 1/10 363/35 |
| 2008/0010474 A1* | 1/2008 | Chapuis | H02M 3/157 713/300 |
| 2008/0197708 A1* | 8/2008 | Yang | H02M 3/285 307/82 |
| 2010/0060350 A1* | 3/2010 | Zhang | H03H 11/1286 327/553 |
| 2011/0077792 A1 | 3/2011 | Shimoda et al. | |
| 2011/0100735 A1 | 5/2011 | Flett | |
| 2011/0118886 A1 | 5/2011 | Muneshima et al. | |
| 2011/0126038 A1* | 5/2011 | Korba | H02J 3/24 713/401 |
| 2012/0283887 A1* | 11/2012 | Goldsmith | G06Q 50/06 700/287 |
| 2013/0110300 A1* | 5/2013 | Sinsabaugh | H02J 7/34 700/291 |
| 2013/0131879 A1* | 5/2013 | Andresen | H02J 3/386 700/287 |
| 2013/0268131 A1* | 10/2013 | Venayagamoorthy | H02J 3/16 700/286 |
| 2014/0222226 A1* | 8/2014 | Bell | H02J 4/00 700/291 |
| 2015/0102689 A1* | 4/2015 | Persson | H02J 3/01 307/105 |
| 2015/0277396 A1* | 10/2015 | Nishida | G05B 7/02 700/72 |

FOREIGN PATENT DOCUMENTS

| | | |
|---|---|---|
| JP | 2002349417 A | 12/2002 |
| JP | 2006333563 | 12/2006 |
| JP | 2011097693 A | 5/2011 |
| RU | 2396175 | 10/2010 |
| WO | 2009136641 | 11/2009 |

OTHER PUBLICATIONS

Hongxin, J., et al., "Design of Hybrid Energy Storage Control System for Wind Farms Based on Flow Battery and Electric Double-Layer Capacitor," Asia-Pacific Power and Energy Engineering Conference. Mar. 28-31, 2010. pp. 1-6. Chengdu, China.
English Translation of Japanese Office Action, Japanese Application No. 2016-545820 dated Oct. 3, 2017, 6 pgs.
Japanese Office Action, Japanese Application No. 2016-545820, dated Oct. 3, 2017, 5 pgs.
Search Report and Written Opinion, PCT Appln. No. PCT/US15/010243, dated Mar. 5, 2015, 12 pgs.
Russian Search Report, Russian Application No. 2016132485, dated Nov. 30, 2017, 4 pgs.
Zhou et al., "Composite Energy Storage System Involving Battery and Ultracapacitor With Dynamic Energy Management in Microgrid Applications," in Power Electronics, IEEE Transactions on , vol. 26, No. 3, pp. 923-930, Mar. 2011.
Canadian Office Action, Canadian Application No. 2,936,440, dated Mar. 5, 2018, 4 pgs.
The State Intellectual Property Office of the People's Republic of China, First Office Action for corresponding Chinese patent application No. 201580010613.6 dated Feb. 26, 2018, 6 pgs.
The State Intellectual Property Office of the People's Republic of China, English Translation of First Office Action for corresponding Chinese patent application No. 201580010613.6 dated Feb. 26, 2018, 12 pgs.

\* cited by examiner

METHOD AND APPARATUS FOR CONTROLLING A HYBRID ENERGY STORAGE SYSTEM

TECHNICAL FIELD

The present invention generally relates to energy storage systems, and particularly relates to hybrid energy storage systems involving two or more types of energy storage units.

BACKGROUND

Hybrid electrical grids, including the localized shipboard electrical grids used in marine vehicles, represent an area of increasing interest and rapid development, not least because these grids can significantly reduce greenhouse gas emissions as a consequence of their potentially greater efficiency. In this context, a "hybrid" electrical grid includes one or more generation sources and one or more energy storage systems. The energy storage system(s) provide a mechanism to store some of the energy produced by the generation source(s) and/or obtained through one or more regenerative processes, and to provide some or all of the stored energy to the grid, e.g., to meet peak loading demands and/or to smooth out the demand variations imposed on the generation source(s).

When a hybrid electrical grid includes more than one type of energy storage unit, e.g., a battery-based energy storage unit and a capacitor-based energy storage unit, the energy storage system represented by these different types of energy storage units may be referred to as a hybrid energy storage system. While use of different types of energy storage units in a hybrid energy storage system offers the promise of greater system efficiency, or at least greater operational flexibility, these benefits come at the expense of increased complexity. Put simply, the promised benefits are not obtained absent intelligent control of the hybrid energy storage system. Moreover, there exists a real risk that the increased complexity and/or expense of controlling hybrid energy storage systems will outweigh the potential benefits of such systems.

For example, known approaches to power-sharing control for hybrid energy storage systems extend to cases involving energy storage units of two different types. Control in this conventional context relies on either load power or load current measurements and these measurements often are difficult to obtain when the hybrid electrical grid includes distributed loads. This drawback notwithstanding, known approaches include filtering a measurement signal to obtain a filtered signal component for controlling an energy storage unit of a first type, and a remaining signal component for controlling an energy storage unit of a second type.

While the above approach is effective in the limited contexts where it is applied, it is not readily adaptable to hybrid energy storage systems involving multiple types of energy storage units. Moreover, the above conventional approach is ill suited for hybrid energy storage systems involving distributed loads, possibly on different buses, where local bus measurements may be critical for optimal operation of the various energy storage units.

SUMMARY

In one aspect of the teachings herein, a control apparatus and corresponding control method use per-unit filtering in a plurality of power-sharing controllers, to obtain a power-sharing command signal for respective ones among a plurality of different energy storage units in a hybrid energy storage system. The hybrid energy storage system forms part of a hybrid electrical grid and includes two or more types of energy storage units. The power-sharing command signal for each energy storage unit is obtained filtering an input signal using a filter having a filter response that is tailored to the energy storage characteristics of the energy storage unit. The input signal reflects electrical grid load variations and may be locally generated or provided by another node. While the power-sharing control loops used for each energy storage unit advantageously may be the same in terms of architecture and implementation, each such loop uses tailored, dedicated filtering and, possibly, individualized values of one or more other control parameters, so that each energy storage unit is operated in a manner that complements its energy storage characteristics.

In an example embodiment, a control apparatus is configured for controlling a hybrid energy storage system that includes two or more energy storage units associated with an electrical grid comprising one or more electrical buses. At least two of the energy storage units have different energy storage characteristics and different ones of the energy storage units may be associated with the same electrical bus in the electrical grid or with different electrical buses in the grid. The contemplated control apparatus includes a power-sharing controller corresponding to each energy storage unit, and a charging-state controller corresponding to each energy storage unit. Each charging-state controller is configured to control charging and discharging of the corresponding energy storage unit through an associated local converter unit, in response to a power-sharing command signal generated by the corresponding power-sharing controller.

Advantageously, the power-sharing command signal generated for the charging-state controller of each energy storage unit is tailored to the characteristics of the energy storage unit, based on the corresponding power-sharing controller including a filter circuit that is configured to obtain a filtered input signal, based on filtering an input signal to the power-sharing controller according to a filter response that is tailored to the energy storage characteristics of the corresponding energy storage unit. The input signal reflects load variations on the electrical grid and thus can be understood as a control input to which the power-sharing controller dynamically responds. Each power-sharing controller further includes a control circuit configured to generate the power-sharing command signal as a combination of the filtered input signal and a steady-state command signal representing a targeted steady-state condition of the corresponding energy storage unit.

In another embodiment, a method of controlling two or more energy storage units having different energy storage characteristics. The method includes controlling the discharging and charging of each energy storage unit via a charging-state controller that is configured to control a converter corresponding to the energy storage unit in response to a power-sharing power command signal individually generated for the energy storage unit. Here, generating the power-sharing power command signal individually for each energy storage unit includes obtaining an input signal for each energy storage unit that reflects load variations on the electrical grid, filtering the input signal for each energy storage unit via a filter circuit having a filter response that is tailored to the energy storage characteristics of the energy storage unit, to obtain a filtered input signal, and combining the filtered input signal for each energy storage unit with a steady-state command signal for the energy storage unit, said steady-state command signal representing a targeted steady-state condition of the energy storage unit.

Of course, the present invention is not limited to the above features and advantages. Those of ordinary skill in the art will recognize additional features and advantages upon reading the following detailed description, and upon viewing the accompanying drawings.

DETAILED DESCRIPTION

Figure 1:
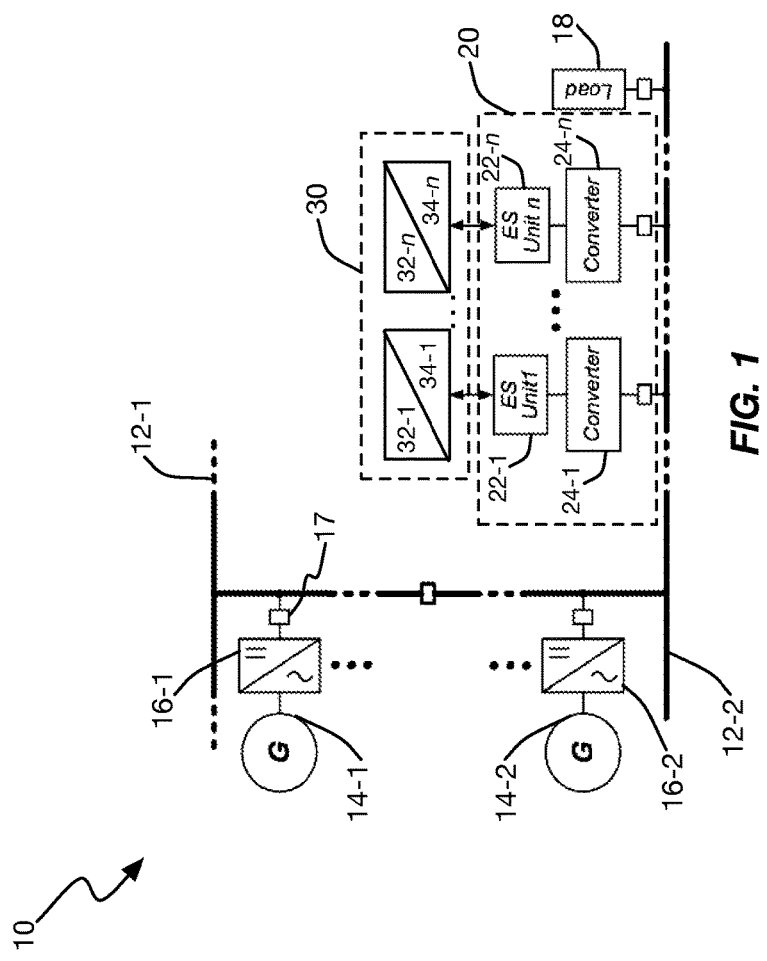
FIG. 1 is a block diagram of one embodiment of a control apparatus for controlling a hybrid energy storage system.

FIG. 1 illustrates a hybrid electrical grid or system 10, which includes one or more electrical buses 12, e.g., DC bus 12-1, 21-2. The hybrid electrical grid 10 further includes one or more generation sources 14 and corresponding coupling circuits 16, for coupling the generation sources 14 to a respective electrical bus 12, e.g., generation source 14-1 couples to the bus 12-1 through the coupling circuit 16-1, while the generation source 14-2 couples to the bus 12-2 through the coupling circuit 16-2. For an example case where a given electrical bus 12 is a DC bus, the coupling circuit(s) 16 each comprises an AC/DC converter. The coupling circuits 16 may connect to their respective electrical buses 12 through circuit breakers 17.

Note that where suffixes are not needed for clarity, any of the reference numbers 12, 14 and 16 may be used without suffixes for singular or plural reference. A similar approach is taken in the remainder of this discussion, with respect to certain other reference numbers herein.

The hybrid electrical grid 10 provides power to one or more loads 18, and, of particular interest herein, the hybrid electrical grid 10 includes a hybrid energy storage system 20, which includes two or more energy storage units 22, with each energy storage unit 22 being coupled to a respective electrical bus 12 via a local converter unit 24. By way of non-limiting example, the diagram depicts a number of energy storage units 22-1 through 22-n, and a corresponding number of respective local converter units 24-1 through 4-n. Here, "n" is an integer number having a value of two or greater.

Different ones of the energy storage units 22 may couple to the same electrical bus 12 or to different electrical buses 12 within the electrical grid 10. Thus, it will be understood that each energy storage unit 22 has a "corresponding" electrical bus 12, which is the electrical bus 12 in the electrical grid 10 to which that particular energy storage unit 22 is coupled. Different energy storage units 22 may therefore have the same corresponding electrical bus 12, or may have different corresponding electrical buses 12, depending on whether they couple to the same electrical bus 12 or to different electrical buses 12 in the electrical grid 10.

Further, it shall be assumed that at least two of the electrical storage units 22 are of different types—i.e., that at least two of the electrical storage units 22 use different energy storage technologies and therefore have substantively different energy storage characteristics. Subject to the foregoing limitation, n energy storage units may represent up to n different energy storage technologies. In this context, the "hybrid" designation as applied to the energy storage system 20 indicates the use of more than one type of energy storage technology and the "hybrid" designation as applied to the electrical grid 10 indicates the use of energy storage in conjunction with energy generation.

According to this disclosure, the electrical grid 10 advantageously includes or is otherwise associated with a control apparatus 30 that is configured for controlling each energy storage unit 22 is in a manner that is tailored to its particular energy storage characteristics, based on the use of dedicated control-signal filtering with respect to each energy storage unit 22. As will be seen, the control apparatus 30 provides for robust distributed control, and offers "serial" or "parallel" arrangements of the power-sharing controllers 32 and charging-state controllers 34 that make up the control apparatus 30. This flexibility maintains robust, tailored control of each energy storage unit 22, irrespective of whether their corresponding power-sharing controllers 32 are interconnected in a control sense, and irrespective of whether common or localized control input signals are used to drive the power-sharing controllers 32.

For n energy storage units 22, at least functionally, there are n power-sharing controllers 32 and n charging-state controllers 34, with respective pairs of the power-sharing controllers 32 and charging-state controllers 34 corresponding to respective ones of the energy storage units 22. Further, the term "controller" as used in the context of the power-sharing controllers 32 and charging-state controllers 34 denotes fixed or programmed circuitry, along with any communication or signaling interfaces needed, e.g., for receiving input signals or measurements, for inter-controller signaling between a power-sharing controller 32 and its corresponding charging-state controller 34, or for command/control signaling from a given one of the charging-state controllers 34 to its respective energy storage unit 22/local converter unit 24.

In at least one embodiment, the circuitry comprising each power-sharing controller 32 and its corresponding charging-state controller 34 is programmatically implemented via one or more microprocessors, DSPs, FPGAs, ASICs, or other digital processing circuitry. This circuitry is at least partly configured according to the execution of program instructions comprising a computer program stored on a non-transitory basis in a computer-readable medium that is included in or accessible to the digital processing circuitry comprising the controllers 32 and 34.

With these non-limiting implementation details in mind, the contemplated control apparatus 30 is configured for controlling a hybrid energy storage system 20 comprising two or more energy storage units 22. Each energy storage unit is associated with a corresponding electrical bus 12 in the hybrid electrical and having different energy storage characteristics. The control apparatus 30 includes a power-sharing controller 32 corresponding to each energy storage unit 22. Each power-sharing controller 32 is configured to generate a power-sharing command signal. The control apparatus 30 further includes a charging-state controller 34 corresponding to each energy storage unit 22. Each charging-state controller 34 is configured to control charging and discharging of the corresponding energy storage unit 22 through an associated local converter unit 24, in response to the power-sharing command signal generated by the corresponding power-sharing controller 32.

As a non-limiting example, n equals two and the hybrid energy storage system 20 includes two energy storage units 22, denoted as 22-1 and 22-2. Correspondingly, the control apparatus 30 includes a first power-sharing controller 32-1 and a corresponding first charging-state controller 34-1, both corresponding to the first energy storage unit 22-1. Similarly, the control apparatus 30 in this example case further includes a second power-sharing controller 32-2 and a corresponding second charging-state controller 34-2, both corresponding to the second energy storage unit 22-2.

Figure 2A:
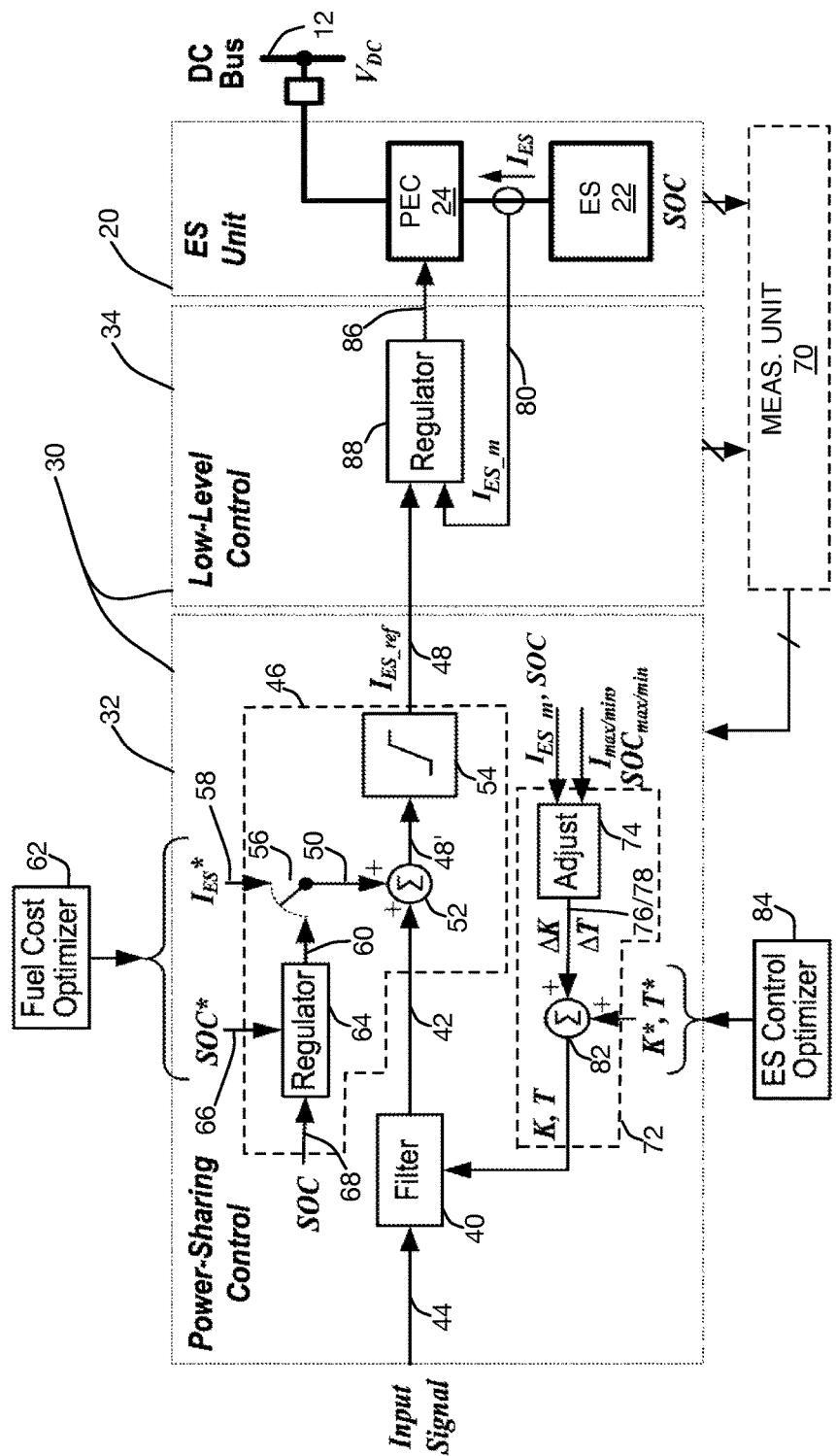
FIGS. 2A-2C are block diagrams of the control apparatus according to several example arrangements.

FIG. 2A illustrates example details for a given power-sharing controller 32 and its corresponding charging-state controller 34, both of which are shown in context with their corresponding energy storage unit 22 and the associated local converter unit 24—denoted as PEC 24, where PEC stands for "power electronic converter." The illustrated embodiment is a current-mode implementation and, among other things, this configuration means that the power-sharing command signal is generated as a current-mode command signal, for input to the charging-state controller 34.

The example power-sharing controller 32 includes a filter circuit 40 that is configured to obtain a filtered input signal 42, by filtering an input signal 44 to the power-sharing controller 32. The filtering is performed according to a filter response that is tailored to the energy storage characteristics of the corresponding energy storage unit 22 and the input signal 44 reflects load variations on the electrical grid 10. As described herein, the input signal 44 to each power-sharing controller 32 may be derived by the power-sharing controller 32 according to local grid measurements, or may be provided by another power-sharing controller 32, or may be provided by some other remote node, e.g., from system-wide global measurements, such as the overall system load.

In any case, each power-sharing controller 32 implemented in the control apparatus 30 advantageously includes a dedicated filter circuit 40 having its filter response tailored to the energy storage characteristics of the corresponding energy storage unit type. For example, consider an arrangement where a first energy storage unit 22-1 is a super-capacitor based energy storage unit and a second energy storage unit 22-2 is a battery-based energy storage unit. Here, the filter circuit 40 of the power-sharing controller 32 corresponding to the super-capacitor based energy storage unit is configured to have a higher frequency response than the filter circuit 40 of the power-sharing controller 32 corresponding to the battery-based energy storage unit.

The input signal 44 represents dynamic power, current or voltage measurements for the electrical grid 10, such measurements may be made locally at the power-sharing controller 32, or be provided by another power-sharing controller 32 or other node, or both. In turn, the filtered input signal 42 represents a filtered version of the dynamic power, current, or voltage measurements that is tailored to the respective energy storage characteristics of the corresponding energy storage unit 22.

In one embodiment, the input signal 44 to each power-sharing controller 32 comprises a difference signal representing a voltage difference signal between a measured bus voltage of the electrical grid 10 and a nominal voltage setting. For example, the difference signal may be formed as the difference between a nominal bus voltage setting and a bus voltage measurement signal obtained for the electrical bus 12 corresponding to the energy storage unit 22 that is associated with the power-sharing controller 32. In complementary fashion, a control circuit 46 in the power-sharing controller 32 is configured to generate the aforementioned power-sharing command signal, identified hereafter with reference number "48," as a combination of the filtered input signal 42 and a steady-state command signal 50 that represents a targeted steady-state condition of the corresponding energy storage unit 22.

In the non-limiting example illustrated, the power-sharing command signal 48 is labeled as $I_{ES\_ref}$, to denote that it is a current-mode control reference for input to the charging-state controller 34, which is denoted in the diagram as providing for the low-level control of the local converter unit 24, used to control the charging and discharging of the corresponding energy storage unit 22. In more detail, a combining circuit 52 in the control circuit 46 combines the steady-state command signal 50 with the filtered input signal 42, to obtain the power-sharing command signal 48, which is denoted as 48'.

In the illustrated example, the signal 48' is passed through a limiter 54 in the control circuit 46, to obtain the power-sharing command signal 48, which is subject to the limits imposed by the limiter 54. Thus, in one or more embodiments, the power-sharing command signal 48 is obtained by combining the filtered input signal 42 with a steady-state command signal 50 that represents a targeted steady-state charging or discharging power, steady-state charging or discharging current, or steady-state state of charge for the corresponding energy storage unit 22, and further by passing the combined signal 48' through a limiter 54.

The steady-state command signal 50 is output from a switching circuit 56, which may be implemented programmatically in one or more embodiments. For example, the switching circuit 56 comprises computer logic that selects the source signal to output to the combining circuit 52 as the steady-state command signal 50. In this example, the switching circuit 56 outputs the steady-state command signal 50 either as a first input command signal 58, or as a derived input command signal 60.

The first input command signal 58 here is a steady-state current command signal denoted as $I_{ES*}$. The "*" denotes that the signal in question is an external command input to the power-sharing controller 32, and that notation is used throughout the remainder of this disclosure. The first input command signal 58 in the illustrated example comes from a fuel-cost optimizer computer or other node 62 that is communicatively coupled to the power-sharing controller 32, such as by an Ethernet link or other communication link. Hereafter, the node 62 will be referred to as the cost-optimization node 62.

The derived input command signal 60 is derived by a regulator circuit 64 based on a second input command signal 66, which here comprises a steady-state state-of-charge (SOC) command signal denoted as SOC*, and a measured or estimated state-of-charge signal 68 denoted as SOC. According to this notation, SOC* denotes the targeted or desired state-of-charge for the energy storage unit 22 corresponding to the power-sharing controller 32, and SOC denotes the actual—as measured or otherwise estimated—state-of-charge for the corresponding energy storage unit 22.

For these and other measurements or estimations, the power-sharing controller 32 and charging-state controller 34 in one or more embodiments include or are associated with a measurement unit 70. The measurement unit 70 includes, for example, one or more sensor or measurement circuits, e.g., for power, current and/or voltage sensing with respect to the corresponding electrical bus 12 and/or for power, current, voltage and/or state-of-charge sensing with respect to the energy storage unit 22. As is known to those of skill in the art, such circuitry may include signal sampling interfaces having digitization circuitry, for obtaining digital values representing the analog measurements corresponding to current, voltage, charge, etc. In general, at least some local grid measurements—e.g., any one or more of power, current, voltage, state-of-charge, etc.—are taken and fed into both the low-level control loop implemented by the charging-state controller 34 and the power-sharing control loop implemented by the power-sharing controller 32.

Other illustrated details include a filter adaptation circuit 72, which is implemented in one or more embodiments of the contemplated power-sharing controller 32. The filter adaptation circuit 72 allows the filter response of the filter circuit 40 to be re-tuned according to changing optimization or control targets and/or to be individually tailored to the particular energy storage characteristics of the individual energy storage unit 22 with which the power-sharing controller 32 is associated.

The example filter adaptation circuit 72 includes an adjustment circuit 74 that produces adjustment signals 76 ($\Delta$K) and 78 ($\Delta$T), which represent adjustments to the filter gain K and time constant T of the filter circuit 40. These adjustments are based on, e.g., a plurality of input signals, including: (1) the aforementioned measured or estimated state-of-charge, SOC, signal 68; (2) a feedback signal 80 from the energy-storage unit 22; and one or more configured maximum or minimum values. In current-mode implementations, the feedback signal 80 is denoted as $I_{ES\_m}$ and represents an estimate of the actual $I_{ES}$ from (or into) the corresponding energy storage unit 22. The maximum and/or minimum parameters include $SOC_{max/min}$ values representing the maximum and/or minimum permissible state-of-charge for the energy storage unit 22, and, in this current-mode implementation, $I_{max/min}$ values representing upper and/or lower magnitude limits for the energy storage unit current $I_{ES}$.

The adjustment signals 76 and 78 ($\Delta$K and $\Delta$T) are combined in a combining circuit 82 with commanded values for K and T, denoted here as K* and T*, to produce the operational values of K and T used by the filter circuit 40. An energy-storage control optimizer 84 provides the commanded values K* and T*, for example. The energy-storage control optimizer 84 may comprise a computer or other network node that is communicatively coupled to the power-sharing controller 32, and may be implemented in, or in conjunction with, the earlier-mentioned cost-optimization node 62. Hereafter, the energy-storage control optimizer 84 is referred to as the control-optimization node 84.

Thus, in some embodiments, the filter circuit 40 in at least one of the power-sharing controllers 32 is an adaptive filter circuit. Each adaptive filter circuit is configured to adapt its filter response as a function of at least one of: a commanded change in frequency response, a commanded change in gain, an adjustment signal derived from a measured steady-state or state-of-charge condition of the energy storage unit and a corresponding maximum or minimum steady-state or state-of-charge setting.

Further illustrated details include the charging-state controller 34 generating a converter control signal 86 via a regulator circuit 88. Here, the regulator circuit 88 receives as its input signals the current-mode power-sharing command signal 48 and the feedback signal 80. In this current-mode embodiment, the regulator responds to the power-sharing command signal 48 as $I_{ES\_ref}$ and the feedback signal 80 as $I_{ES\_m}$. Alternatively, FIG. 2B depicts another configuration, which is based on power-mode control and measurement, rather than current-mode control and measurement.

Figure 2B:
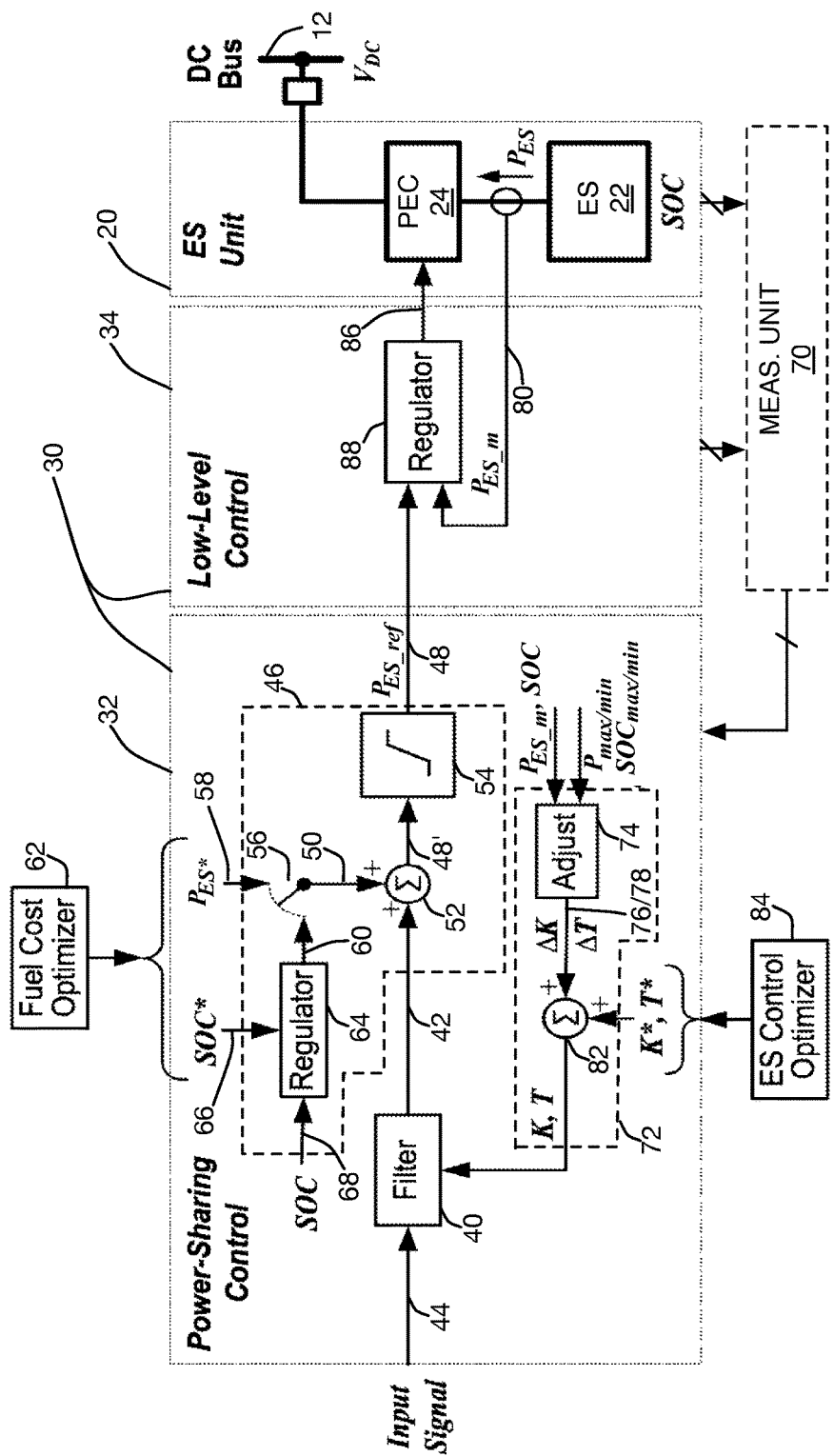

In FIG. 2B, all "$I_{ES}$" annotations are replaced by "$P_{ES}$" annotations, to indicate that the involved signal values are power-mode rather than current mode. For example, the first input command signal 58 is a commanded steady-state power signal, denoted by $P_{ES*}$, the power-sharing command signal 48 is denoted as $P_{ES\_ref}$, etc. Here, each charging-state controller 34 acts as a low-level controller that sends switching signals to the local converter unit 24, to regulate the current being sourced from or sunk into the energy storage unit 22. Regulation of the local converter unit 24 by the charging-state controller 34 follows the power-sharing command signal 48, as generated in the power-sharing control loop of the corresponding power-sharing controller 32.

In more detail, the power-sharing control loop at issue here includes the aforementioned filter circuit 40—which may be a single filter or a set of filters. The filter circuit 40 sets different gains for different frequency bands of the input signal 44, which here may be a load power measurement. The steady-state command signal 50—here a steady-state power signal—is combined with the filtered input signal 42, to obtain the power-sharing command signal 48, as a power control reference signal for driving the charging-state controller 34. As such, each energy storage unit 22 responds differently for load variations of different frequencies, such that each energy storage unit 22 contributes the most within the frequency band(s) that best match its discharging characteristics.

Figure 2C:
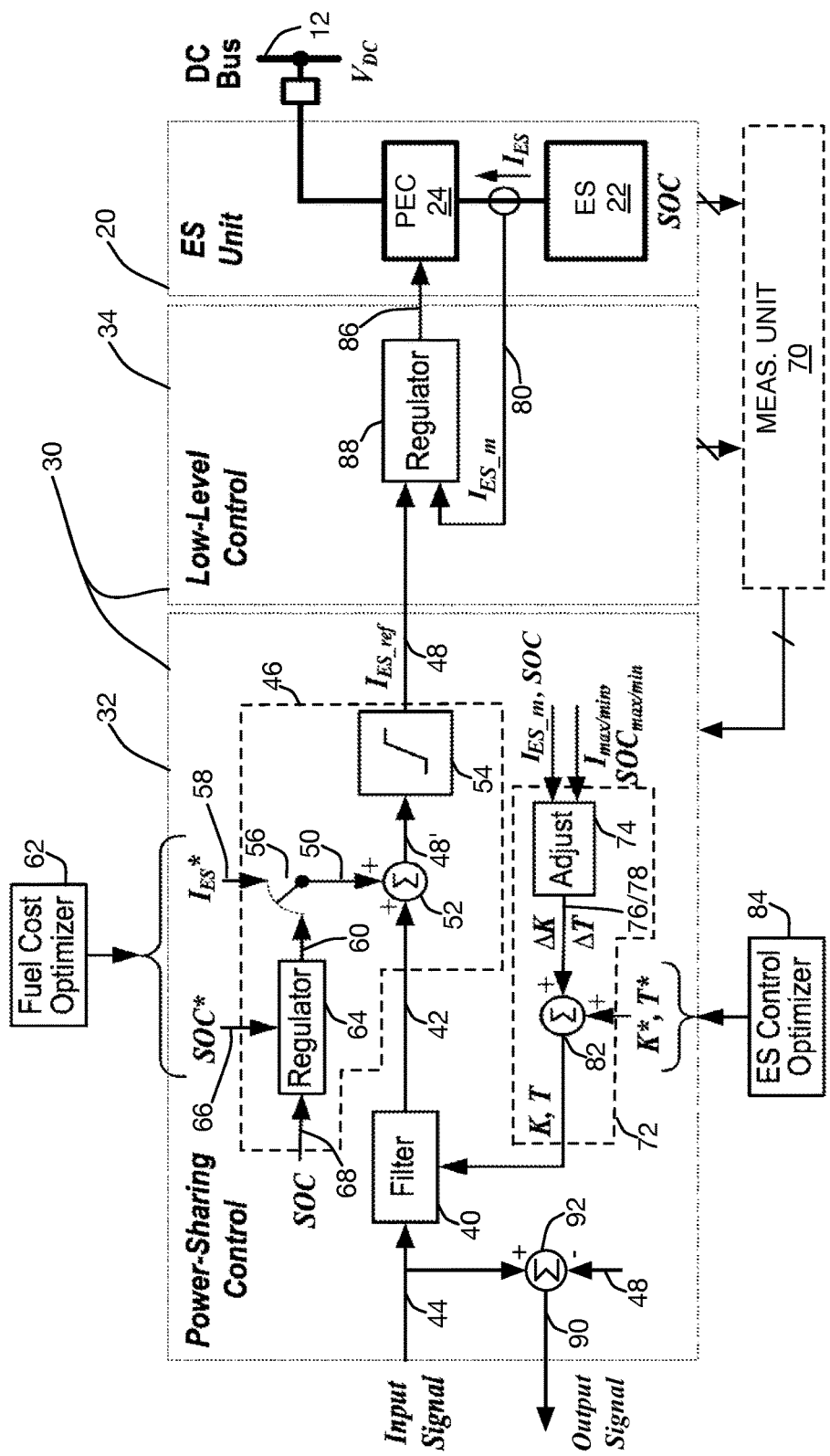

FIG. 2C illustrates yet another variation, for use in embodiments where one or more power-sharing controllers 32 takes an output signal 90 generated from another power-sharing controller 32, as its input signal 44. Thus, the depicted power-sharing controller 32 includes a combining circuit 92 that forms the output signal 90 as the difference between its input signal 44—which itself may be an output signal 90 from a logically "prior" power-sharing controller 32—and this output signal 90 is fed as the input signal 44 to a logically "succeeding" power-sharing controller 32. Even here, however, it will be noted that the input signal 44 to each power-sharing controller 32 is advantageously filtered by a dedicated filtering function in which the filter response is tailored to the energy storage characteristics of the corresponding energy storage unit 22.

Thus, for at least one embodiment herein, the hybrid energy storage system 20 includes first and second energy storage units 22-1 and 22-2. Correspondingly, the control apparatus 30 comprises a first power-sharing controller 32-1 and a first charging-state controller 34-1 corresponding to the first energy storage unit 22-1, and a second power-sharing controller 32-2 and a second charging-state controller 34-2 corresponding to the second energy storage unit 22-2. Further, the first and second power-sharing controllers 32-1 and 32-2 are coupled in a series arrangement, such that the input signal 44 to the second power-sharing controller 32-2 is provided as an output signal 90 from the first power-sharing controller 32-1. The first power-sharing controller 32-1 in this arrangement is configured to generate the output signal 90 as the difference between the input signal 44 to the first power-sharing controller 32-1 and the power-sharing command signal 48 generated by the first power-sharing controller 32-1.

In the above example, the input signal 44 into the second power-sharing controller 32-2 is fed from the first power-sharing controller 32-1, and there may be communication latency associated with it. As a consequence of this arrangement, the input signal 44 to the second power-sharing controller 32-2 represents remote measurements or estimates for the electrical bus(es) 12, which are delayed or offset with respect to the instantaneous local conditions experienced by the second power-sharing controller 32-2, by an amount corresponding to the communication latency (which may be a known value).

To address the latency issue, the latency-compensation circuit 94, as would be implemented in the second power-sharing controller 32-2 in this example, is configured to compensate for the communication latency. The compensation is based on predicting values of the input signal 44 as a function of low-latency local grid measurements obtained for the energy storage unit 22-2 corresponding to the power-sharing controller 32. These local grid measurements may be obtained from the aforementioned measurement unit 70. For example, the local grid measurements comprise power, current, voltage, load, or other measurements made for the electrical bus 12 corresponding to the energy storage unit 22.

In an example configuration, the latency-compensation circuit 94 is configured to adapt prediction of the subject input signal 44, based on tracking differences between estimated values of the local grid measurements, as indicated by the input signal 44, and corresponding actual values of the local grid measurements. Here, it will be understood that the local grid measurements in question will be of whatever type (current, power, etc.) as is/are represented by the input signal 44. Further, it will be understood that the latency-compensation circuit 94 may use local grid measurements from sample times corresponding to the offset or delay of the communication latency suffered by the input signal 44.

Figure 4:
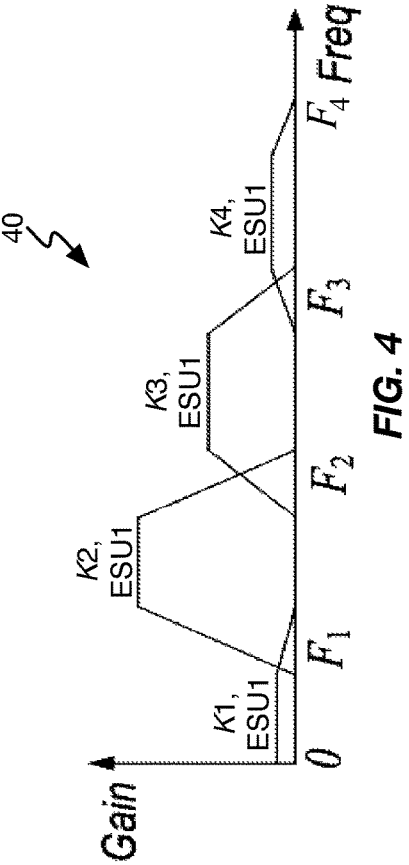
FIG. 4 is a plot of example filter characteristics, for the tuned filters used in the control apparatus taught herein.

In the context of the above arrangement and also for non-series arrangements contemplated herein, FIG. 4 illustrates an example of how the use of dedicated, per energy storage unit filtering provides flexibility regarding control optimization, among its other advantages. One sees that the filter circuit 40 as used in any given power-sharing controller 32 may use different gains in different frequency bands, thus providing significant tuning flexibility, for tailoring the filtering circuit 40 to the energy storage characteristics of the corresponding energy storage unit 22.

In the diagram, a given one of the energy storage units 22 is denoted as "ESU1," and one sees that there are four filter gain parameters K, shown in as K1 through K4, for four partially overlapping frequency bands. The filtering used for other energy storage units 22 in the hybrid energy storage system 20 may be more or less complex, in dependence on their type. Of course, it will be appreciated that the same filter parameters can be used, at least initially, for all energy storage units 22 of the same type—i.e., for all energy storage units 22 that have the same energy storage characteristics. Example energy storage characteristics include but are not limited to: maximum/minimum permissible power levels, maximum/minimum permissible current (sink or source), or other charging characteristics, such as optimal state of charge, etc.

The use of dedicated filtering in each power-sharing controller 32 is one aspect of the advantageous fact that each power-sharing controller 32 is configured to operate autonomously with respect to the other power-sharing controllers 32 in the control apparatus 30. This autonomy holds whether one or more of the input signals 44 for the power-sharing controllers 32 represents the output signal 90 of a "prior" power-sharing controller 32, or whether the input signal 44 for each power-sharing controller 32 is independently obtained.

Of course, there may be a centralized computer or other control node, such as an optimization controller, which sets steady-state targets, etc., for the various energy storage units 22. Further, the respective input signal 44 to each power-sharing controller 32 may be obtained as a common signal input to all power-sharing controllers 32, or each power-sharing controller 32 may obtain its own input signal 44 based on local grid measurements made each power-sharing controller 32. Still further, the input signal 44 to any given power-sharing controller 32 may be provided as an output signal 90 from a given other power-sharing controller 32.

Figure 5:
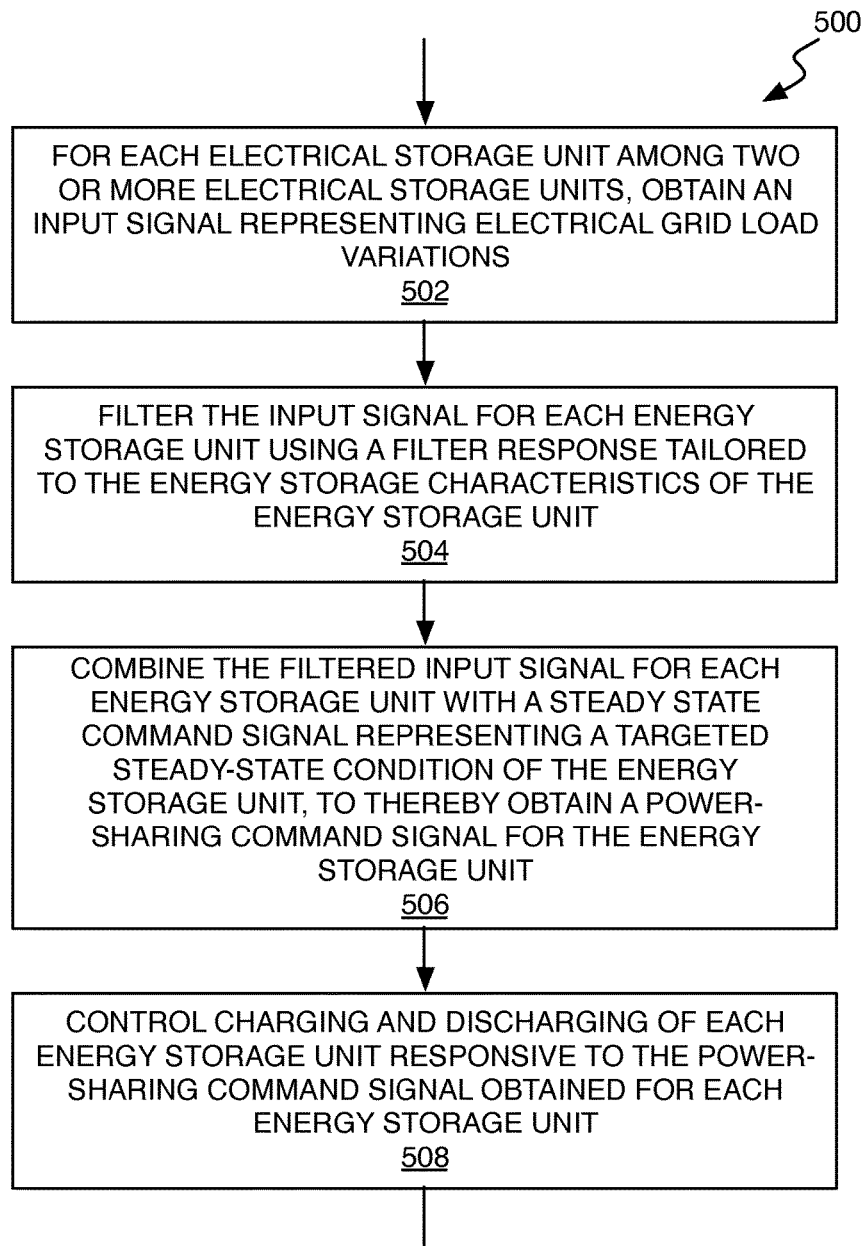
FIG. 5 is a logic flow diagram of one embodiment of a method of controlling a hybrid energy storage system, according to processing taught herein.

FIG. 5 illustrates a method 500, e.g., as may be implemented in the power-sharing controller 32 and the charging-state controller 34 pair with each energy storage unit 22 and associated local converter unit 24 in the hybrid energy storage system 20. The method 500 comprises controlling two or more energy storage units 22 having different energy storage characteristics. Each energy storage unit 22 has a corresponding electrical bus 12 in the associated electrical grid 10, which includes the hybrid energy storage system 20. The energy storage units 22 may couple to the same electrical bus 12, or at least two of them may couple to different electrical buses 12 in the electrical grid 10.

The method 500 includes obtaining an input signal 44 (Block 502) for each energy storage unit 22. Here, "obtain" can mean generating the input signal 44, e.g., based on local grid measurements, or receiving the input signal 44 from another power-sharing controller 32, or from some other node. In any case, the input signal 44 reflects load variations on the electrical grid 10. The method 500 further includes, for each energy storage unit 22, filtering (Block 504) the input signal 44, to thereby obtain a filtered input signal 42. The filtering here is, for each energy storage unit 22, tailored to the energy storage characteristics of the energy storage unit 22.

The method 500 further includes combining (Block 506) the filtered input signal 42 for each energy storage unit 22 with a steady-state command signal 50 for the energy storage unit 22. The steady-state command signal 50 representing a targeted steady-state condition of the energy storage unit 22. Still further, the method 500 includes controlling (Block 508) the discharging and charging of each energy storage unit 22 via the corresponding charging-state controller 34, which is configured to control a local converter unit 24 associated with the corresponding, energy storage unit 22 in response to the power-sharing command signal 48 individually generated for the energy storage unit 22.

Figure 3:
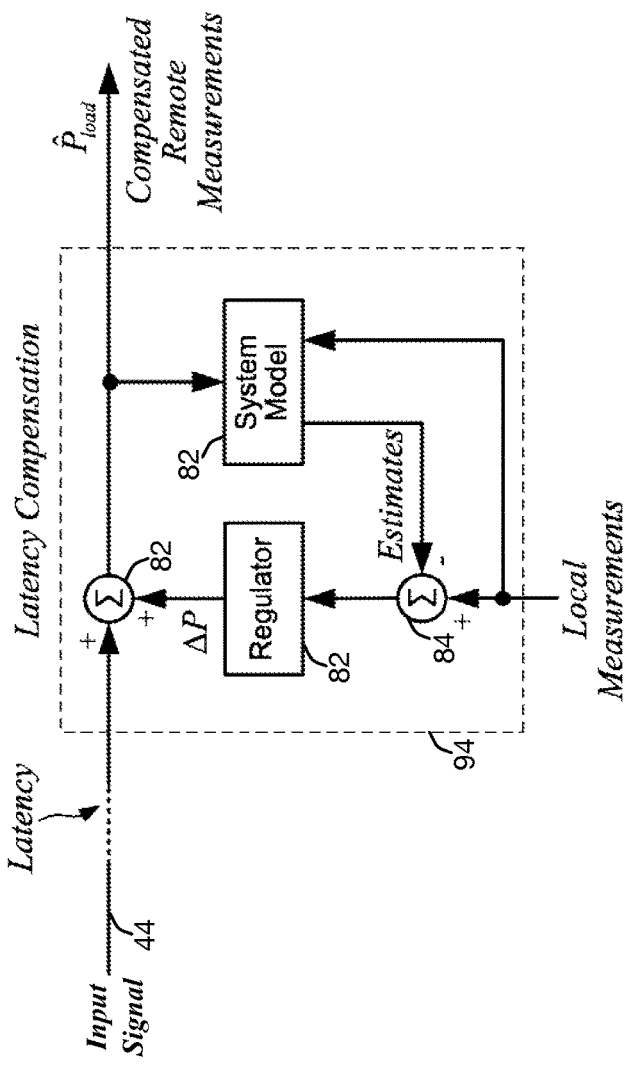
FIG. 3 is a block diagram of a lag compensation circuit used in one or more embodiments of a control apparatus for controlling a hybrid energy storage system.

Thus, whether used for shipboard DC power systems or other applications, the control apparatus 30 and the method 500 provide for the use of dedicated input signal filtering on a per energy-storage-unit basis, which enables the use of gains at different frequency bands in the power-sharing control loop used for each energy storage unit 22, such as shown in FIG. 3. When used in DC marine power systems, where diesel generators operate at variable speeds to improve fuel efficiency, the hybrid energy storage system 20 may be used to improve fuel efficiency by offsetting the diesel operating points and/or smoothing out load variations, and the control apparatus 30 provides better optimized control when the hybrid energy storage system 20 includes two or more types of energy storage units 22, such as flywheels, super capacitors, and batteries, or even among different battery types, such as lead-acid, lithium ion, etc.

As a further advantage, apart from the different frequency responses gained via tailored filtering, the power-sharing controllers 32 may all implement identical control loops, albeit possibly with different values of the applicable control parameters. The control parameters may be optimized online—e.g., by an optimization node communicatively coupled to the power-sharing controllers 32—or offline. Further, as noted, the power-sharing controllers 32 may be connected in series or may not be interconnected.

In some embodiments, the power-sharing controllers 32 that control the same type of energy storage units 22 and/or are associated with the same electrical bus 12 may be series interconnected. If interconnected, the power-sharing controllers 32 may be communicatively coupled together using a common communication bus, such as an Ethernet network or other data interconnection. The same or other data links may be used for any one or more of the following: providing steady-state target values to individual ones of the power-sharing controllers 32; providing input signals 44 to respective power-sharing controllers 32; reconfiguring control parameters, e.g., filter-circuit adaptation; maintenance activities, e.g., deactivating power-sharing controllers 32 associated with malfunctioning energy storage units 22 or malfunctioning local converter units 24.

Figure 6:
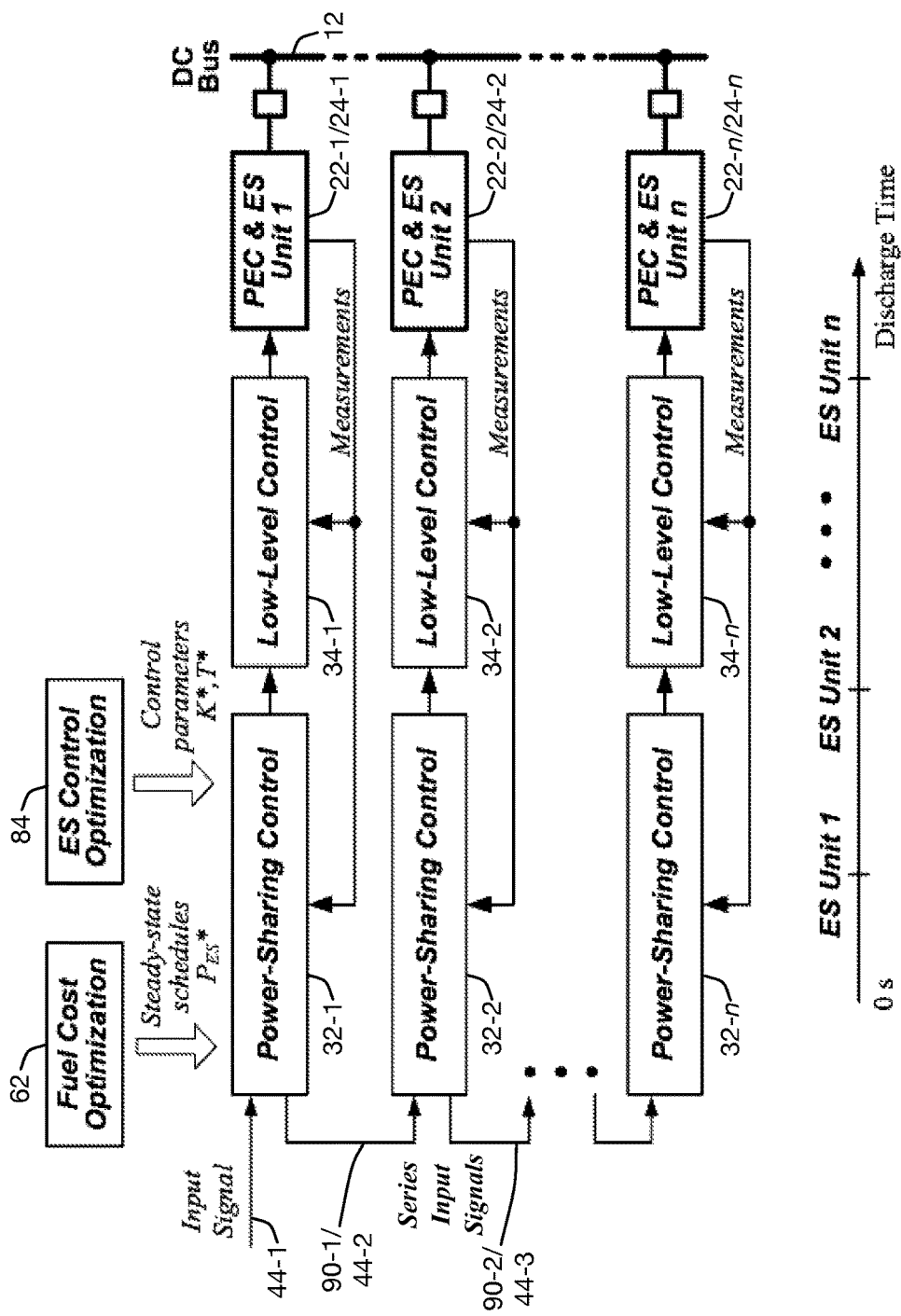
FIG. 6 is a block diagram of one embodiment of a power-sharing and charging-state controller arrangement, for a plurality of energy storage units.

FIG. 6 illustrates an embodiment wherein the control apparatus 30 is configured for a plurality of n energy storage units 22—depicted in the diagram as ES Unit 1 through ES Unit n. Each energy storage unit 22 has an associated local converter unit 24. It will be noted that each local converter unit 24 is controlled by a corresponding one of the charging-state controllers 34-1 through 34-n. In turn, each charging-state controller 34 is controlled by a corresponding one of the power-sharing controllers 32-1 through 32-n.

In the illustrated embodiment, the power-sharing controllers 32-1 through 32-n are series-interconnected in an order corresponding to the discharge times—e.g., as expressed in energy-to-power ratios—of the corresponding energy storage units 22-1 through 22-n. In this particular example, the first energy storage unit 22-1 has the fastest discharge time and its corresponding power-sharing controller 32-1 is "first" in the series arrangement. As such, the first power-sharing controller 32-1 generates the output signal 90-1, to be used as the input signal 44-2 for the second power-sharing controller 32-2, which is associated with the next-fastest energy storage unit 22-2. In turn, the second power-sharing controller 32-2 generates the output signal 90-2, to be used as the input signal 44-3 for the next power-sharing controller 32 in the series, and so on.

This arrangement positions the power-sharing controller 32 corresponding to the energy storage unit 22 having the shortest discharge time—e.g., the most power-intensive unit—first, and positions the power-sharing controller 32 corresponding to the energy storage unit 22 having the longest discharge time—e.g., the least power-intensive unit—last, at the end of the "control string." The cost-optimization node 62 in this example is configured to output control parameters representing steady-state schedules of the energy storage units 22. These control parameters are based on long-term load forecasts and here comprise targeted steady-state power values, $P_{ES*}$, for the power-sharing controllers 32. Such values are shown in FIG. 2B as an example of the first input command signal 58 that may be provided to each power-sharing controller 32.

Note that other embodiments use two or more control strings—i.e., two or more subsets of power-sharing controllers 32 are strung together, with each but the last power-sharing controller 32 in the control string providing an output signal 90, for use as the input signal 44 to the next power-sharing controller 32 in the control string. There is, for example, a control string for each subset of energy storage units 22 of the same type and/or a control string for each subset of energy storage units 22 on the same electrical bus 12.

Further in FIG. 6, the control-optimization node 84 executes an optimization process that determines certain power-sharing control parameters based on short-term load variation forecasts. Here, the short-term control parameters are commanded gain and time-constant values, K* and T*, to be used in the dedicated filter circuit 40 of each power-sharing controller 32.

Figure 7:
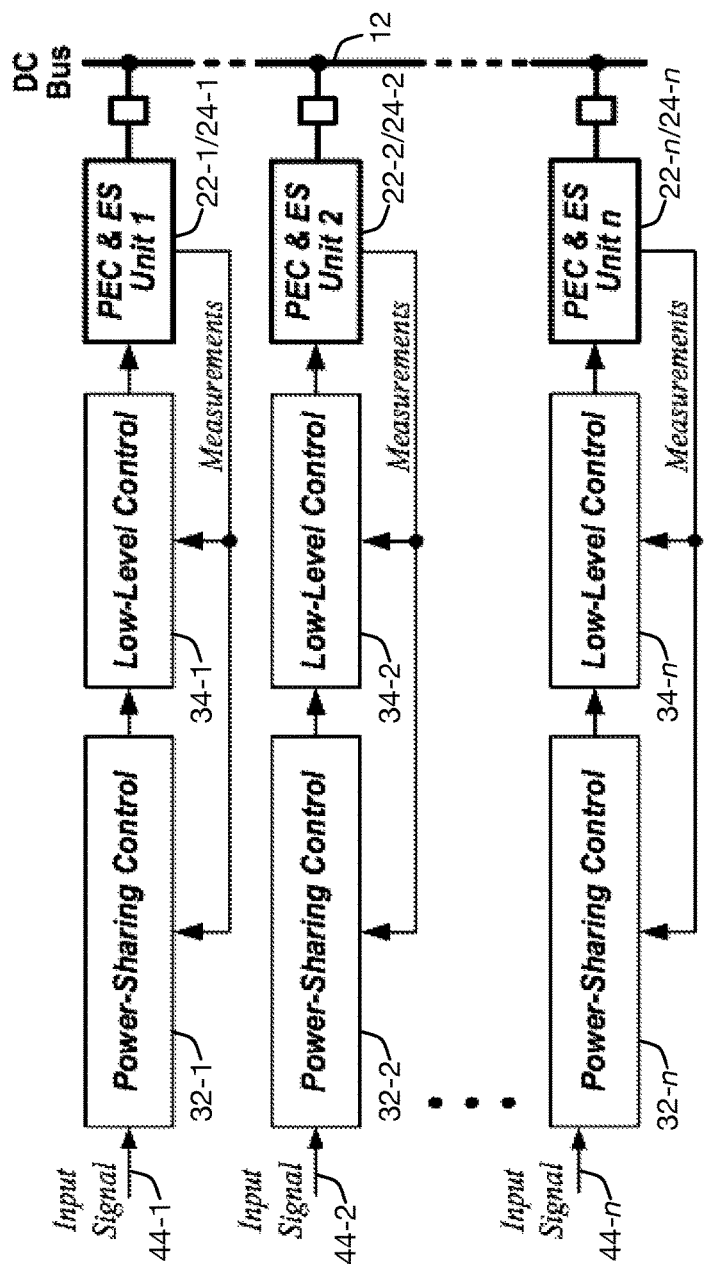
FIG. 7 is a block diagram of another embodiment of a power-sharing and charging-state controller arrangement, for a plurality of energy storage units.

FIG. 7 illustrates a non-series arrangement of power-sharing controllers 32 and their respective charging-state controllers 34. Each power-sharing controller/charging-state controller pair corresponds to one of the n energy storage units 22 and its associated local converter unit 24. In contrast to the serial control string depicted in FIG. 6, the input signal 44 to each power-sharing controller 32 depicted in FIG. 7 is either generated by the power-sharing controller 32 from local grid measurements, e.g., as provided by the measurement unit 70 introduced in FIG. 2A, or is provided to the power-sharing controller 32 from a remote control and/or measurement system.

Figure 8:
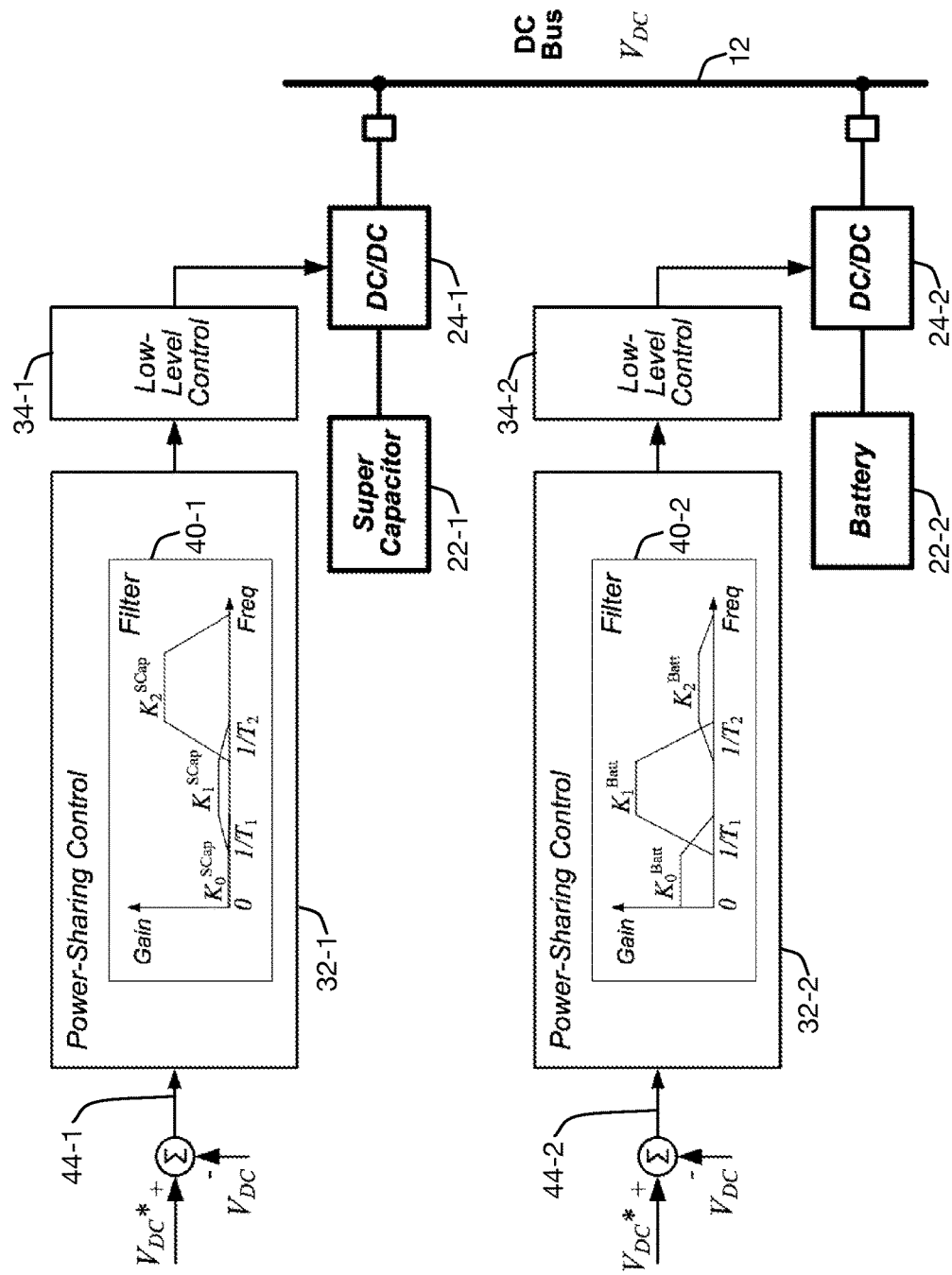
FIG. 8 is a block diagram of one embodiment of a power-sharing and charging-state controller arrangement, for a super capacitor and a battery as two different types of energy storage units in a hybrid energy storage system.

FIG. 8 illustrates an example embodiment that involves first and second energy storage units 22-1 and 22-2, which here are coupled to the same electrical bus 12 through respective local converter units 24-1 and 24-2. More broadly, of course, different energy storage units 22 may be coupled to the same or to different electrical buses 12, and thus may be associated with the same or different load(s) 18 and/or different "localized" bus conditions.

In the example arrangement, the first energy storage unit 22-1 is a super capacitor and the second energy storage unit 22-2 is a battery, e.g., a lead-acid battery or a lithium ion battery. Notably, one sees the particular tailoring of the respective filter circuits 40-1 and 40-2, included in the corresponding power-sharing controllers 32. The filter circuit 40-1, for example, effectively has zero gain (K0=0) for a first bandwidth going from zero to 1/T1, where T1 represents the period of a first frequency, a relatively low gain K1 for a second, higher frequency band, and a relatively high gain K2 for the highest frequency band. These gains complement the charge/discharge characteristics of the super capacitor, and contrast with the example gain values depicted for the battery-based electrical storage unit 22-2.

Figure 9:
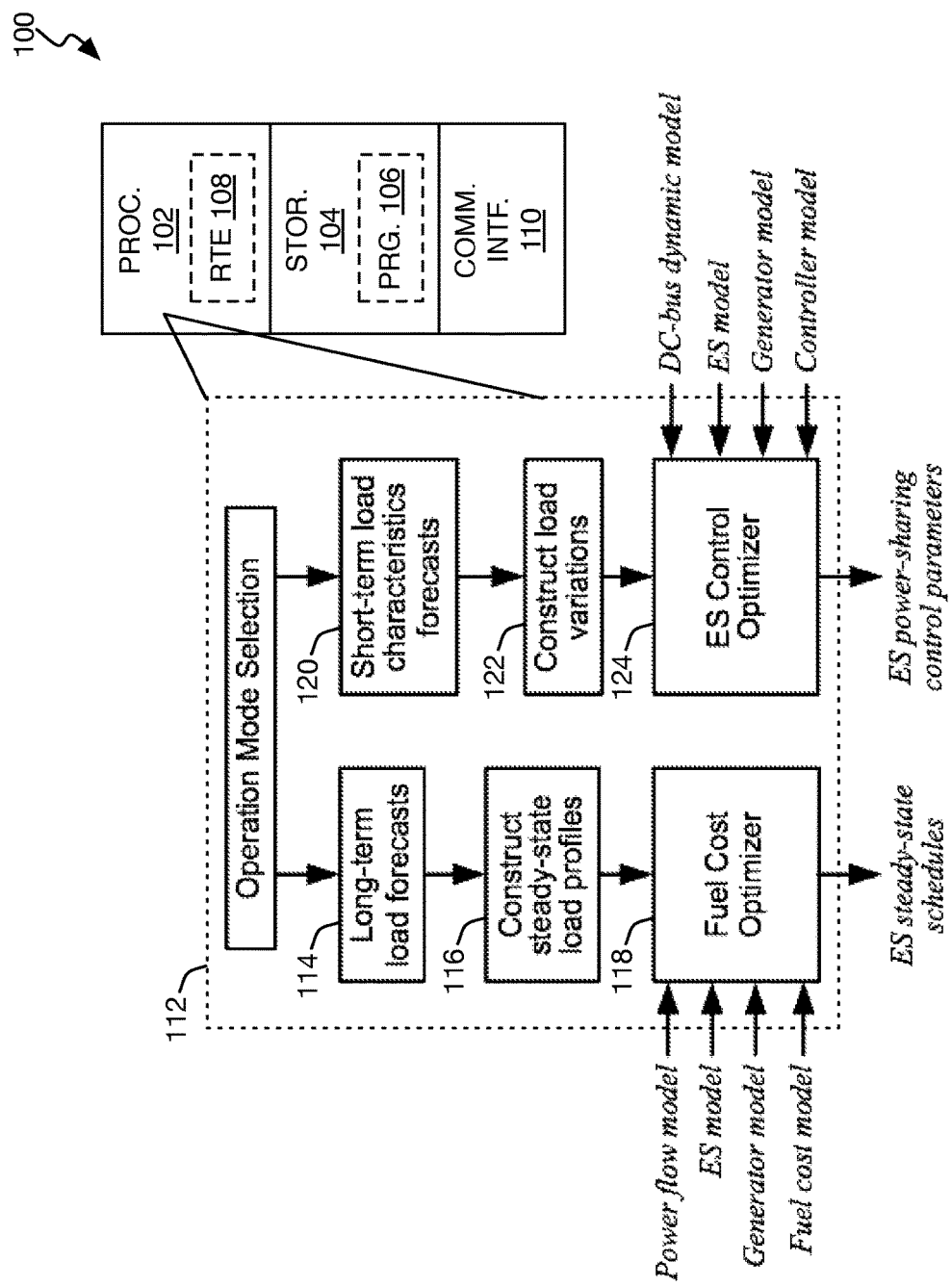
FIG. 9 is a block diagram of a computer system configured for optimizing the control as provided by the control apparatus taught herein, for controlling a hybrid energy storage system.

FIG. 9 illustrates a control node 100, which may be a computer or other processing node having a CPU or other processing circuit 102, which includes or is associated with storage 104—e.g., some type of computer-readable medium providing non-transitory storage for a computer program 106. The processing circuit 102 provides a run-time environment 108, in which it implements the depicted functional processing elements base, e.g., on its execution of program instructions from the computer program 106. The functional processing elements may be understood as implementing the functionality of the aforementioned cost-optimization node 62 and control-optimization node 84. As such, the control node 100 further includes one or more communication interfaces—e.g., a computer network interface—for communicating with the control apparatus 30.

The functional elements 114, 116 and 118 represent the functionality of the cost-optimization node 62. These processing blocks include a fuel-cost optimizer 118, which outputs steady-state command values for the power-sharing controllers 32, based on considering a number of inputs. These inputs include a power-flow model, energy-storage unit models for the different types of energy storage units 22 implemented in the hybrid energy storage system 20, generator models for the generators 14 implemented in the electrical grid 10, and a fuel-cost model. These inputs may be obtained via the communication interface(s) 110, which may include, e.g., access to the Internet or other external networks, to provide changing fuel cost information, etc., and which may include one or more file input/output interfaces, e.g., for accessing local or remote databases that contain relevant modeling information.

The functional elements 120, 122 and 124 represent the functionality of the control-optimization node 84. These processing blocks include an ES-control optimizer 124, which output power-sharing control parameters—e.g., filter parameters—for the power-sharing controllers 32, based on considering a number of inputs. These inputs include a dynamic bus model, energy-storage unit models, generator model(s), and controller models, e.g., for power-sharing controllers 32 and/or the charging-state controllers 34.

Consider a marine vessel as an example case. For a selected operation mode of the marine vessel, long-term steady-state load forecasts and short-term load variation forecasts are first obtained. Based on the steady-state load forecasts, optimal steady-state schedules for the energy storage units 22 are obtained using the system power flow model, the energy-storage unit models, the diesel operational characteristics, and fuel cost and efficiency curves. Further, based on the short-term load variations, a set of optimal power-sharing control parameters—e.g., filter parameters—are obtained using the DC-bus dynamics, and the energy-storage unit models, diesel generator models, and the controller models.

Broadly, the control node 100, or another node, may operate as an upper-level Power and Energy Management System or PEMS. The PEMS may have communication links to the contemplated control apparatus 30, e.g., for providing each power-sharing controller 32 with optimized command signals for targeted steady-state values and/or with optimized filter settings, etc. Of course, in other embodiments, the power-sharing controllers 32 used preconfigured control and/or filter settings. However, in such embodiments, the power-sharing controllers 32 may adapt or otherwise adjust such control and filtering values during ongoing operation.

In any case, the control apparatus 30 allows substantially identical power-sharing control loops to be used for all energy storage units 22 in a hybrid energy storage system 20, while still providing for different control strategies for different types of energy storage units 22, e.g., by using different steady-state or other target values and/or different filter settings in different power-sharing controllers 32.

In a contemplated series arrangement of power-sharing controllers 32, the most power-intensive electrical storage units 22 always react first to high-frequency load variations, which reduces the cycling and improves the lifetime of the more energy-intensive electrical storage units 22—e.g., the ones which have slower charge/discharge times but which store more energy. In this arrangement, the energy-intensive energy storage units 22 act as a back up to supply power variation and supplies most load energy for low-frequency variations.

Of course, the series control-string approach is but one example. More generally, the power-sharing controllers 32 may be understood as providing a distributed control approach for controlling some number of energy storage units 22, where two or more of those energy storage units 22 are of different types and have differing energy storage characteristics. The distributed strategy offers a number of benefits, including reduced risk of individual unit failures.

Notably, modifications and other embodiments of the disclosed invention(s) will come to mind to one skilled in the art having the benefit of the teachings presented in the foregoing descriptions and the associated drawings. For example, it will be appreciated that the teachings herein can be applied to a range of applications, including DC electrical grids and AC electrical grids. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A control apparatus for controlling a hybrid energy storage system comprising two or more energy storage units associated with an electrical grid comprising one or more electrical buses, wherein at least two of the energy storage units have different energy storage characteristics, and wherein the control apparatus comprises:
   a power-sharing controller corresponding to each energy storage unit, each power-sharing controller configured to generate a power-sharing command signal; and
   a charging-state controller corresponding to each energy storage unit, each charging-state controller configured to control charging and discharging of the corresponding energy storage unit through an associated local converter unit, in response to the power-sharing command signal generated by the corresponding power-sharing controller;
   each power-sharing controller comprising:
   a filter circuit configured to obtain a filtered input signal by filtering the input signal to the corresponding power-sharing controller according to a filter response that is tailored to the energy storage characteristics of the corresponding energy storage unit, said input signal reflecting load variations on the electrical grid; and
   a control circuit configured to generate the power-sharing command signal for the corresponding energy storage unit as a combination of the filtered input signal and a steady-state command signal for the corresponding energy storage unit representing a targeted steady-state condition of the corresponding energy storage unit;
   wherein the at least two energy storage units include first and second energy storage units, and wherein the control apparatus comprises a first power-sharing controller and a first charging-state controller corresponding to the first energy storage unit, and a second power-sharing controller and a second charging-state controller corresponding to the second energy storage unit, and wherein the first and second power-sharing controllers are coupled in a series arrangement, such that the input signal to the second power-sharing controller is provided as an output signal from the first power-sharing controller, wherein the input signal to the second power-sharing controller has a communication latency due to the input signal being fed from the first power-sharing controller such that local grid measurements indicated by the input signal are delayed with respect to instantaneous local grid conditions, and wherein the second power-sharing controller further includes a latency-compensation circuit that is configured to compensate for the communication latency based on predicting values of the input signal as a function of the local grid measurements indicated by the input signal and actual values of the local grid measurements obtained for the second energy storage unit.

2. The control apparatus of claim 1, wherein the latency-compensation circuit is configured to adapt prediction of the input signal based on tracking differences between estimated values of the local grid measurements, as indicated by the input signal, and corresponding actual values of the local grid measurements.

3. The control apparatus of claim 1, wherein the first power-sharing controller is configured to generate the output signal as the difference between the input signal to the first power-sharing controller and the power-sharing command signal generated by the first power-sharing controller.

4. The control apparatus of claim 1, wherein at least one power-sharing controller is configured to receive the input signal in common with the other power-sharing controller or controllers, or from local grid measurements specific to the corresponding energy storage unit.

5. The control apparatus of claim 1, wherein the filter circuit in at least one of the power-sharing controllers is an adaptive filter circuit, and wherein each adaptive filter circuit is configured to adapt its filter response as a function of at least one of: a commanded change in frequency response, a commanded change in gain, an adjustment signal derived from a measured steady-state or state-of-charge condition of the energy storage unit and a corresponding maximum or minimum steady-state or state-of-charge setting.

6. The control apparatus of claim 1, wherein the input signal to at least one power-sharing controller comprises a difference signal representing the difference between a bus voltage measurement signal and a nominal voltage setting.

7. The control apparatus of claim 1, wherein the control circuit in at least one power-sharing controller is configured to generate the power-sharing command signal based on obtaining a combined signal via combining the filtered input signal with a steady-state command signal representing a targeted steady-state charging or discharging power, steady-state charging or discharging current, or steady-state state of charge for the corresponding energy storage unit, and further based on passing the combined signal through a limiter.

8. The control apparatus of claim 1, wherein the first power-sharing controller of the control apparatus is configured for use with a super capacitor as the corresponding energy storage unit and the second power-sharing controller of the control apparatus is configured for use with a battery as the corresponding energy storage unit, and further wherein the filter circuit of the first power-sharing controller is configured to have a higher frequency response than the filter circuit of the second power-sharing controller.

9. A method of controlling two or more energy storage units in a hybrid energy storage system associated with an electrical grid comprising one or more electrical buses, wherein at least two of the energy storage units have different energy storage characteristics and the method comprises:
generating a power-sharing command signal individually for each energy storage unit with a respective one of at least two power-sharing controllers that correspond to respective ones of the energy storage units, the power-sharing command signal based on:
obtaining an input signal for each energy storage unit that reflects load variations on the electrical grid;
filtering the input signal for each corresponding energy storage unit via a filter circuit having a filter response that is tailored to the energy storage characteristics of the energy storage unit, to obtain a filtered input signal;
combining the filtered input signal for each corresponding energy storage unit with a steady-state command signal for the corresponding energy storage unit, said steady-state command signal representing a targeted steady-state condition of the corresponding energy storage unit, to thereby obtain the power-sharing command signal for the corresponding energy storage unit; and
controlling the discharging and charging of each energy storage unit via one of at least two charging-state controllers that correspond to respective ones of the energy storage units, the charge-state controllers each being configured to control a local converter unit associated with the respective energy storage unit in response to the power-sharing command signal individually generated for the energy storage unit;
wherein the at least two energy storage units comprise first and second energy storage units and wherein a first power-sharing controller and a first charging-state controller correspond to the first energy storage unit, and a second power-sharing controller and a second charging-state controller correspond to the second energy storage unit, and wherein the first and second power-sharing controllers are coupled in a series arrangement, such that the input signal to the second power-sharing controller is provided as an output signal from the first power-sharing controller, wherein the input signal to the second power-sharing controller has a communication latency due to the input signal being fed from the first power-sharing controller such that local grid measurements indicated by the input signal are delayed with respect to instantaneous local grid conditions, and wherein the second power-sharing controller further includes a latency-compensation circuit that is configured to compensate for the communication latency based on predicting values of the input signal as a function of the local grid measurements indicated by the input signal and actual values of the local grid measurements obtained for the second energy storage unit.

10. The method of claim 9, further comprising adapting prediction of the input signal based on tracking differences between estimated values of the local grid measurements, as indicated by the input signal, and corresponding actual values of the local grid measurements.

11. The method of claim 9, wherein obtaining the input signal for the second energy storage unit comprises generating the output signal as the difference between the input signal to the first energy storage unit and the power-sharing command signal generated for the first energy storage unit, and using the output signal as the input signal for the second energy storage unit.

12. The method of claim 9, wherein obtaining the input signal for at least one energy storage unit comprises receiving the input signal as derived from the input signal of another one of the energy storage units, or generating the input signal from local grid measurements made for the energy storage unit.

13. The method of claim 9, further comprising, for each one of at least one of the energy storage units, adapting the filter response of the filter circuit used to obtain the filtered input signal for the energy storage unit, as a function of at least one of: a commanded change in frequency response, a commanded change in gain, an adjustment signal derived from a measured steady-state or state-of-charge condition of the energy storage unit and a corresponding maximum or minimum steady-state or state-of-charge setting.

14. The method of claim 9, wherein the input signal obtained for at least one energy storage unit comprises a difference signal representing the difference between a bus voltage measurement signal and a nominal voltage setting.

15. The method of claim 9, wherein generating the power-sharing command signal for at least one energy storage unit is based on obtaining a combined signal via combining the filtered input signal for the energy storage unit with one of a steady-state command signal representing a targeted steady-state charging or discharging power, steady-state charging or discharging current, or steady-state state of charge for the energy storage unit, and further based on passing the combined signal through a limiter.

16. The method of claim 9, wherein the first energy storage unit is a super capacitor and the second energy storage unit is a battery, and wherein the method includes filtering the input signal for the first energy storage unit with a filter circuit having a higher frequency response than the filter circuit used for filtering the input signal of the second energy storage unit.

* * * * *